(12) United States Patent
Mattar (10) Patent No.: US 6,178,828 B1
(45) Date of Patent: Jan. 30, 2001

(54) FREE STANDING CORIOLIS DRIVER

(76) Inventor: Wade M. Mattar, 35 Blake Rd., Wrentham, MA (US) 02093

( * ) Notice: Under 35 U.S.C. 154(b), the term of this patent shall be extended for 0 days.

(21) Appl. No.: 09/022,325

(22) Filed: Feb. 11, 1998

(51) Int. Cl.⁷ .................................................. G01F 1/78
(52) U.S. Cl. ....................................................... 73/861.357
(58) Field of Search ....................... 73/861.355, 861.356, 73/861.357

(56) References Cited

U.S. PATENT DOCUMENTS

| | | |
|---|---|---|
| 3,345,525 | 10/1967 | MacBlane . |
| 3,509,391 | 4/1970 | Pfeuffer . |
| 3,583,209 | 6/1971 | Banks . |
| 3,633,053 | 1/1972 | Peters . |
| 3,754,225 | 8/1973 | Gleason . |
| 4,444,059 * | 4/1984 | Smith ................................ 73/861.37 |
| 4,597,070 | 6/1986 | Redeker . |
| 4,691,578 | 9/1987 | Herzl . |
| 4,710,655 | 12/1987 | Masaki . |
| 4,756,197 | 7/1988 | Herzl . |
| 4,891,991 | 1/1990 | Mattar et al. . |
| 4,911,020 | 3/1990 | Thompson . |
| 5,048,350 | 9/1991 | Hussain et al. . |
| 5,050,439 | 9/1991 | Thompson . |
| 5,054,326 | 10/1991 | Mattar . |
| 5,271,281 * | 12/1993 | Marrar et al. ...................... 73/861.38 |
| 5,321,991 * | 6/1994 | Kalotay ............................. 73/861.37 |
| 5,337,616 | 8/1994 | Lew . |
| 5,343,764 | 9/1994 | Mattar et al. . |
| 5,349,872 * | 9/1994 | Kalotay et al. ................... 73/861.38 |
| 5,363,706 | 11/1994 | Lew . |
| 5,488,203 | 1/1996 | Hassel et al. . |
| 5,546,814 | 8/1996 | Mattar et al. . |

OTHER PUBLICATIONS

K. O. Plache, "Coriolis/Gyroscopic Flow Meter" Mechanical Engineering, pp. 36 to 39, Mar. 1979.

* cited by examiner

Primary Examiner—Benjamin R. Fuller
Assistant Examiner—Jewel V. Thompson
(74) Attorney, Agent, or Firm—Sampson & Associates P.C.

(57) ABSTRACT

A driver is provided for a Coriolis flow meter having a flow tube adapted to vibrate at a predetermined resonance frequency to determine mass flow rate of a fluid passing therethrough. The driver includes a coil, a ferromagnetic core disposed coaxially within the coil, and a spring adapted to resiliently fasten the ferromagnetic core and the coil to one another. The coil is adapted for being rigidly disposed on the flow tube and the ferromagnetic core is adapted to oscillate within the coil in response to excitation of the coil. The spring serves to guide and dampen the oscillations of the ferromagnetic core relative to the coil so that the driver is free from attachment to a non-moving object. A pivotable and/or flexible restraint may be provided to maintain the core along a curved path to centripetally accelerate the core. The driver may also be utilized as a free standing sensor in which the core is oscillated relative to the coil by vibration of the flow tube, so that the coil generates a responsive output signal.

23 Claims, 6 Drawing Sheets

FREE STANDING CORIOLIS DRIVER

BACKGROUND OF THE INVENTION

1. Field of the Invention

This invention relates to Coriolis effect mass flowmeters for measuring fluid flow in a tube or pipe. More particularly, the invention relates to a free standing driver that serves to vibrate the tube or pipe at a resonance frequency without being mechanically grounded.

2. Background Information

Coriolis-type flowmeters have long been utilized to conveniently measure flow of a fluid through a tube or pipe. Although many types of devices may be utilized to perform this function, Coriolis-type devices offer the advantage of providing an output directly proportional to mass flow. This aspect typically enables such devices to provide accurate flow information with reduced need to consider variables such as fluid pressure, temperature and density, etc. Moreover, advantageously, there are no obstacles in the path of the flowing fluid.

The theory underlying a Coriolis-type mass flowmeter and the advantages gained thereby are discussed in an article by K. O. Plache, "Coriolis/gyroscopic Flow Meter" in the March 1979 issue of Mechanical Engineering, pages 36 to 39.

A Coriolis force is generally associated with a continuously rotating system. For example, winds moving uniformly away from the North Pole along a line that appears straight to an observer in space, would appear to an Earthbound observer to curve Westward. This is commonly referred to as the Coriolis effect. Moreover, a person moving on a turntable or merry-go-round at what appears to be a constant linear speed radially outward on the surface thereof, actually speeds up in the tangential direction. The change in tangential velocity indicates that the person has been accelerated. This Coriolis acceleration of the person generates a force known as a Coriolis force in the plane of rotation perpendicular to the radial movement of the mass. The person will experience this Coriolis force as a lateral force applied from the opposite direction as the acceleration and must lean sideways to compensate for it in order to continue to move forward along the merry-go-round's radius. In vector terminology, the Coriolis force vector is proportional and opposite to the cross-product of the angular velocity vector (parallel to the rotational axis) and the velocity vector of the mass in the direction of its travel with respect to the axis of rotation (e.g. in the radial direction).

It is this Coriolis force or effect that has been applied to mass flow measurement. If a pipe is rotated about a pivot axis orthogonal to the pipe, each discrete portion of material flowing through the pipe is a radially traveling mass which experiences acceleration. The Coriolis reaction force shows up as a deflection or offset of the pipe in the direction of the Coriolis force vector in the plane of rotation.

Coriolis mass flowmeters fall into two categories: continuously rotating and oscillating. The principal functional difference between these two types is that the oscillating version, unlike the continuously rotating one, has periodically (usually sinusoidally) varying angular velocity which produces a continuously varying level of Coriolis force.

Many Coriolis flow meters are dependent on phase shift measurements of the oscillation or twisting of the flow tubes during fluid flow. In a phase shift type device, a driver is mounted to a medial portion of the flow tube between the inlet and outlet thereof. When there is no flow through the flowmeter, all points along the flow tube oscillate with identical phase. As fluid begins to flow, Coriolis accelerations of the fluid cause areas along the flow tube to have a different phases. The phase on the inlet side of the flow tube lags the driver, while the phase on the outlet side leads the driver. Sensors can be placed on the flow tube to produce sinusoidal signals representative of the motion of the flow tube. The phase difference between two sensor signals is proportional to the mass flow rate of fluid through the flow tube.

Advantageously, an oscillatory system may employ the bending resiliency of the pipe itself as a hinge or pivot point for oscillation and thus obviate separate rotary or flexible joints. A major difficulty in these systems however, is that the effect of the Coriolis force is relatively small compared not only to the drive force but also to extraneous vibrations. These flowmeters thus tend to rely on being adequately mechanically grounded at the flexure point of the oscillating conduit, the driver and sensors. Unfortunately, however, provision of such a ground tends to be difficult, complicated and concomitantly, relatively expensive. The use of double tubes that vibrate at equal frequencies and opposite phase tend to increase accuracy by reducing errors from outside vibrations. However, use of such double tubes tends to disadvantageously add complexity and cost relative to single tube devices. Moreover, any dependence on exterior support structures for mechanical grounding can itself introduce vibration, such as may be transmitted to the tubes from nearby machinery or other structures.

In an attempt to address this grounding difficulty, devices have been provided that do not require mechanical grounding. One type of device measures torsional oscillations of a flow tube to calculate mass flow and is disclosed in U.S. Pat. No. 4,756,197, entitled CORIOLIS-TYPE MASS FLOWMETER, issued to Herzl, ("Herzl") which is fully incorporated herein by reference. In this device, the flow tube is a loop supported on a stationary frame, with the driver mounted at the vertex of the loop. When fluid is not flowing, the loop vibrates between parallel planes on either side of its static plane. When fluid passes through the loop, it is subjected to Coriolis forces, causing the vibrating loop to torsionally oscillate in accordance with the mass flow rate of the fluid. The torsional oscillations are sensed by a pair of strain gauge transducers mounted in balanced relation on opposite legs of the loop, whereby the signals yielded by the transducers have a difference in magnitude therebetween that depends on the amplitude of the torsional oscillations.

Another type of device that appears to utilize an ungrounded driver is disclosed in U.S. Pat. No. 5,321,991, entitled CORIOLIS EFFECT MASS FLOWMETER, issued to Kalotay, ("Kalotay") which is also fully incorporated herein by reference. This device utilizes a straight flow tube with an ungrounded magnetostrictive driver mounted at or near an anti-node of the second harmonic mode of the natural frequency of the tube section. One aspect of this device relies on determining phase shift using two sensors in the manner described hereinabove. Alternatively, this device may utilize a single sensor mounted to the pipe section at the node point of the second harmonic mode of the natural frequency of the pipe section during zero flow. This sensor is adapted to measure the amplitude of displacement of the zero flow node point due to the Coriolis effect forces from the mass of the material flowing through the oscillating pipe. This measurement is indicative of the mass flow rate of the material flowing through the pipe.

Both Herzl and Kalotay, however, utilize drivers that have limitations. The Herzl driver is a magnetic device configuration that may be difficult to control in an accurate and repeatable manner. Kalotay's magnetostrictive driver may be easier to control accurately than the Herzl driver, but tends to be relatively complex, expensive, and is generally limited in the amount of vibrational force and amplitude it can apply to a flow tube. Moreover, this driver appears to rely on the inertia of a relatively large, stationary mass. This characteristic itself tends to make Kalotay's driver cumbersome and undesirable for many applications where compact size and light weight are preferred.

A need thus exists for a free-standing driver for a Coriolis flowmeter that is relatively easily controlled, can generate relatively high levels of force and amplitude in a repeatable manner and is comparatively inexpensive to manufacture.

SUMMARY OF THE INVENTION

According to an embodiment of this invention, a transducer is provided for a Coriolis flow meter having a flow tube adapted to vibrate at a predetermined resonance frequency to determine mass flow rate of a fluid passing therethrough. The transducer comprises:

a coil;

a ferromagnetic core disposed coaxially within the coil;

one of the coil and the ferromagnetic core being adapted for being rigidly located on the flow tube;

the ferromagnetic core and the coil being adapted to oscillate relative to one another in response to excitation of one of the coil and the flow tube;

a resilient member adapted to resiliently fasten the ferromagnetic core and the coil to one another, wherein the resilient member means serves to guide the oscillations of the ferromagnetic core relative to the coil; and the transducer being free from attachment to a non-moving object.

The present invention provides, in a second aspect, a Coriolis flowmeter adapted to determine mass flow rate of a fluid therethrough. The Coriolis flowmeter includes:

a flow tube;

a transducer as set forth in the above-described first aspect of the invention, fabricated as a driver and disposed on the flow tube, the driver adapted to vibrate the flow tube at a predetermined resonance frequency;

at least one sensor disposed a predetermined distance from the driver on the flow tube, the sensor being adapted to generate a first output signal corresponding to vibration of the flow tube thereat; and computational means adapted to receive the output signal and determine the mass flow rate.

In a third aspect of the subject invention, a method is provided for vibrating a flow tube of a Coriolis flowmeter at a predetermined resonance frequency to determine the mass flow rate of a fluid passing therethrough. The method comprises the steps of:

(a) providing a driver having:
  (i) a coil;
  (ii) a ferromagnetic core disposed coaxially within the coil; and
  (iii) a resilient member means adapted to resiliently fasten the ferromagnetic core and the coil to one another;

(b) rigidly disposing one of the coil and the ferromagnetic core on the flow tube;

(c) maintaining the driver free from attachment to a non-moving object; and (d) applying an alternating current to the coil, wherein the ferromagnetic core and the coil are oscillated relative to one another, and the resilient member serves to guide the oscillations of the ferromagnetic core relative to the coil.

In a fourth aspect of the subject invention, a method is provided for determining mass flow rate of a fluid passing through a flow tube. The method comprises the steps of:

(a) providing a driver having:
  (i) a coil;
  (ii) a ferromagnetic core disposed coaxially within the coil; and
  (iii) resilient member adapted to resiliently fasten the ferromagnetic core and the coil to one another;

(b) rigidly disposing one of the coil and the ferromagnetic core on the flow tube;

(c) maintaining the driver free from attachment to a non-moving object;

(d) applying an alternating current to the coil, wherein the ferromagnetic core and the coil are oscillated relative to one another at a predetermined frequency, and the resilient member serves to guide the oscillations of the ferromagnetic core relative to the coil, so that the driver vibrates the flow tube at a predetermined resonance frequency;

(e) disposing at least one sensor a predetermined distance from the driver on the flow tube, the at least one sensor being adapted to generate at least one output signal corresponding to vibration of the flow tube thereat;

(f) applying the output signal to a computational means to determine the mass flow rate.

The above and other features and advantages of this invention will be more readily apparent from a reading of the following detailed description of various aspects of the invention taken in conjunction with the accompanying drawings.

DETAILED DESCRIPTION OF THE PREFERRED EMBODIMENTS

Referring to the figures set forth in the accompanying Drawings, illustrative embodiments of the present invention will be described in detail hereinbelow. For clarity of exposition, like features shown in the accompanying Drawings shall be indicated with like reference numerals and similar features as shown in alternate embodiments in the Drawings shall be indicated with similar reference numerals.

Briefly described, the present invention includes a driver 110 (FIG. 3) adapted to vibrate a flow tube 14 of a Coriolis flowmeter 112 (FIG. 4) at a predetermined resonance frequency, without being mounted to a stationary support. Coriolis flowmeter 112 may then be utilized to determine mass flow rate therethrough in a conventional manner. Driver 110 preferably includes a cylindrical coil 16 and a ferromagnetic core 18 disposed coaxially (along coaxis 21) therein. The coil is preferably mounted onto flow tube 14 as shown in FIG. 4. A resilient member or spring 20 (FIG. 3) is provided to resiliently fasten ferromagnetic core 18 within coil 16. The ferromagnetic core is adapted to oscillate generally along the coaxis 21 in response to, oscillatory excitation of the coil. The spring serves to guide the oscillations of the ferromagnetic core in a predictable and consistent manner to enable driver 110 to apply a known vibratory impulse, due to the movement of the mass, to flow tube 14 while being free from attachment to a non-moving object.

Where used in this disclosure, the terms "coaxial" or "coaxis" shall refer to a direction substantially parallel to the central axis of a circular body, such as coaxis 21 of coil 16. Similarly, the term "transverse" shall refer to a direction substantially orthogonal to the coaxial direction. The term "transverse cross-section" shall refer to a cross-section taken along a plane oriented substantially orthogonal to the axial direction of a circular body.

Figure 1:
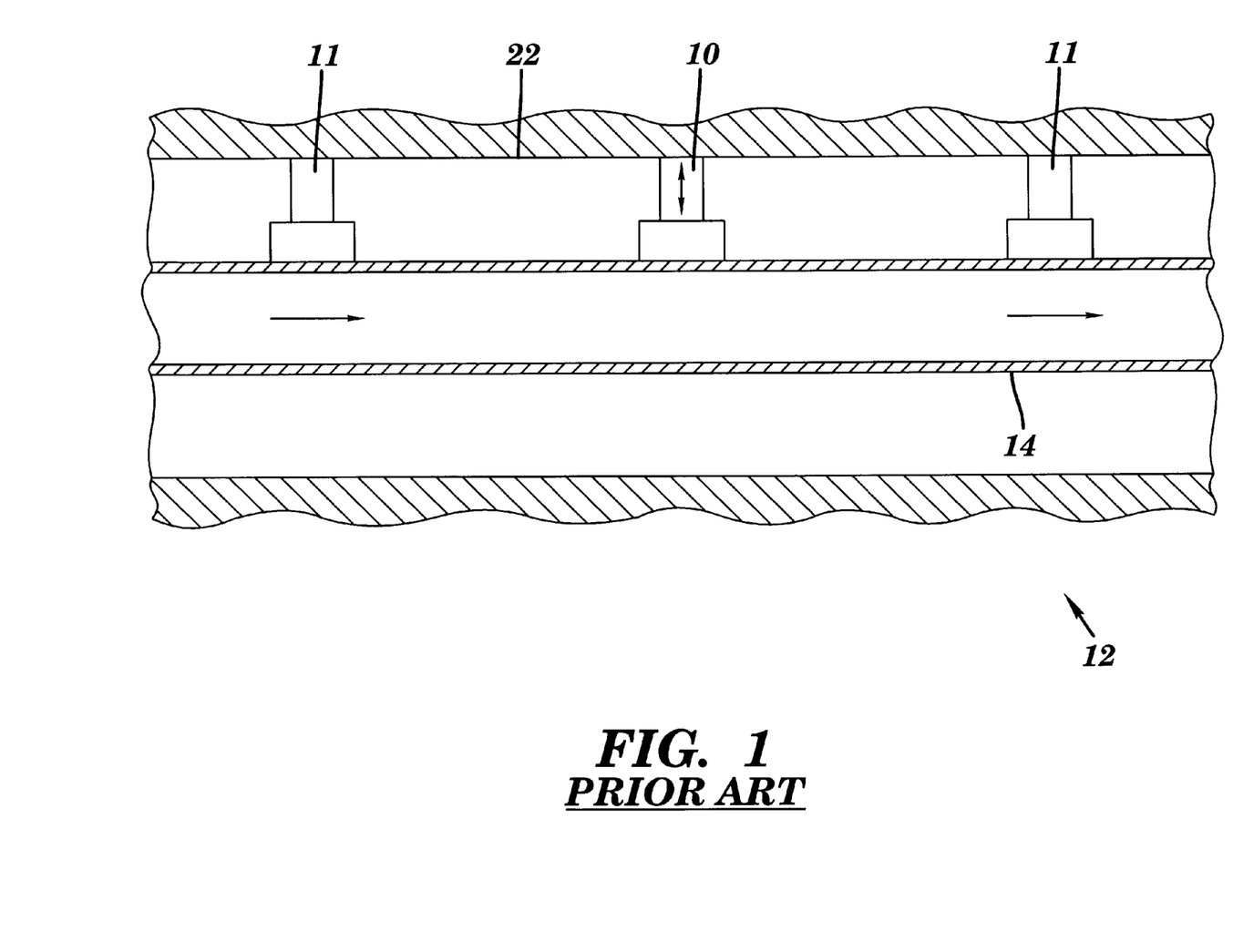
FIG. 1 is a schematic elevational, cross-sectional view of a straight tube Coriolis flowmeter of the prior art.

Referring now to the drawings in detail, as shown in FIG. 1, Coriolis flowmeters of the prior art typically include a driver 10 and a pair of sensors 11 disposed on opposite sides thereof at spaced locations along the length of a flow tube 14. As also shown, each of the driver 10 and sensors 11 is mounted on a stationary support or mechanically grounded housing 22 to facilitate precise excitation of the tube and mass flow measurement in a conventional manner as described hereinabove.

Figure 2:
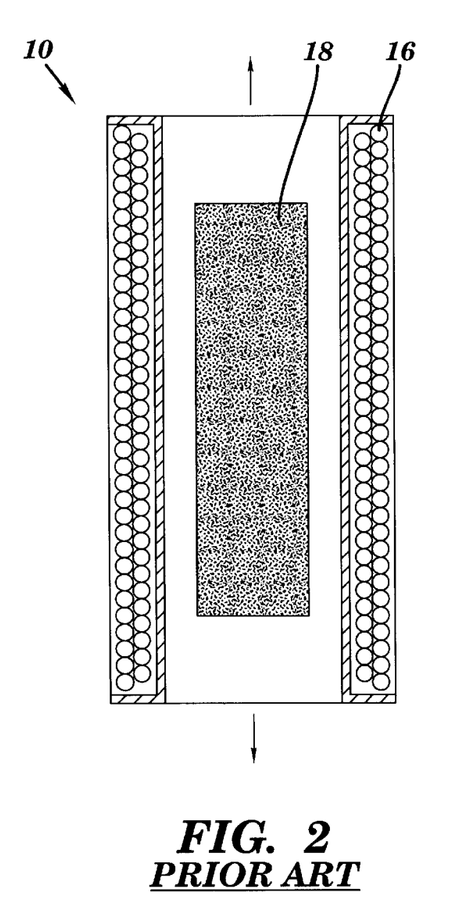
FIG. 2 is a schematic elevational, cross-sectional view of a prior art driver for use in Coriolis flowmeters.

Turning to FIG. 2, driver 10 generally comprises a coil 16 and a ferromagnetic core 18. One of the coil 16 and core 18 is provided with mounting hardware (not shown) sufficient to secure it to support 22 (FIG. 1), while the other of the coil and core is provided with hardware (not shown) sufficient to mount it to flow tube 14 (FIG. 1). Core 18 is adapted to oscillate in a conventional manner upon excitation of the coil 16 by an alternating current source (not shown) to, in turn, vibrate flow tube 14.

Figure 3:
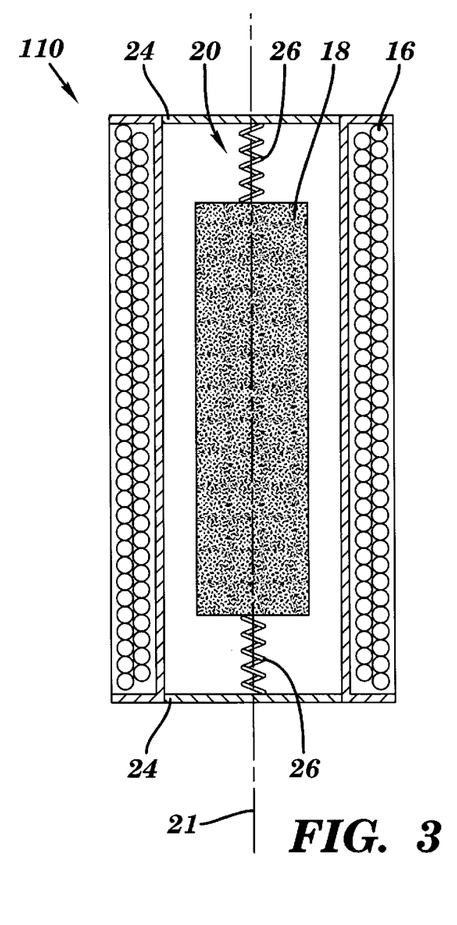
FIG. 3 is a view similar to that of FIG. 2, of a Coriolis driver of the present invention.
Figure 4:
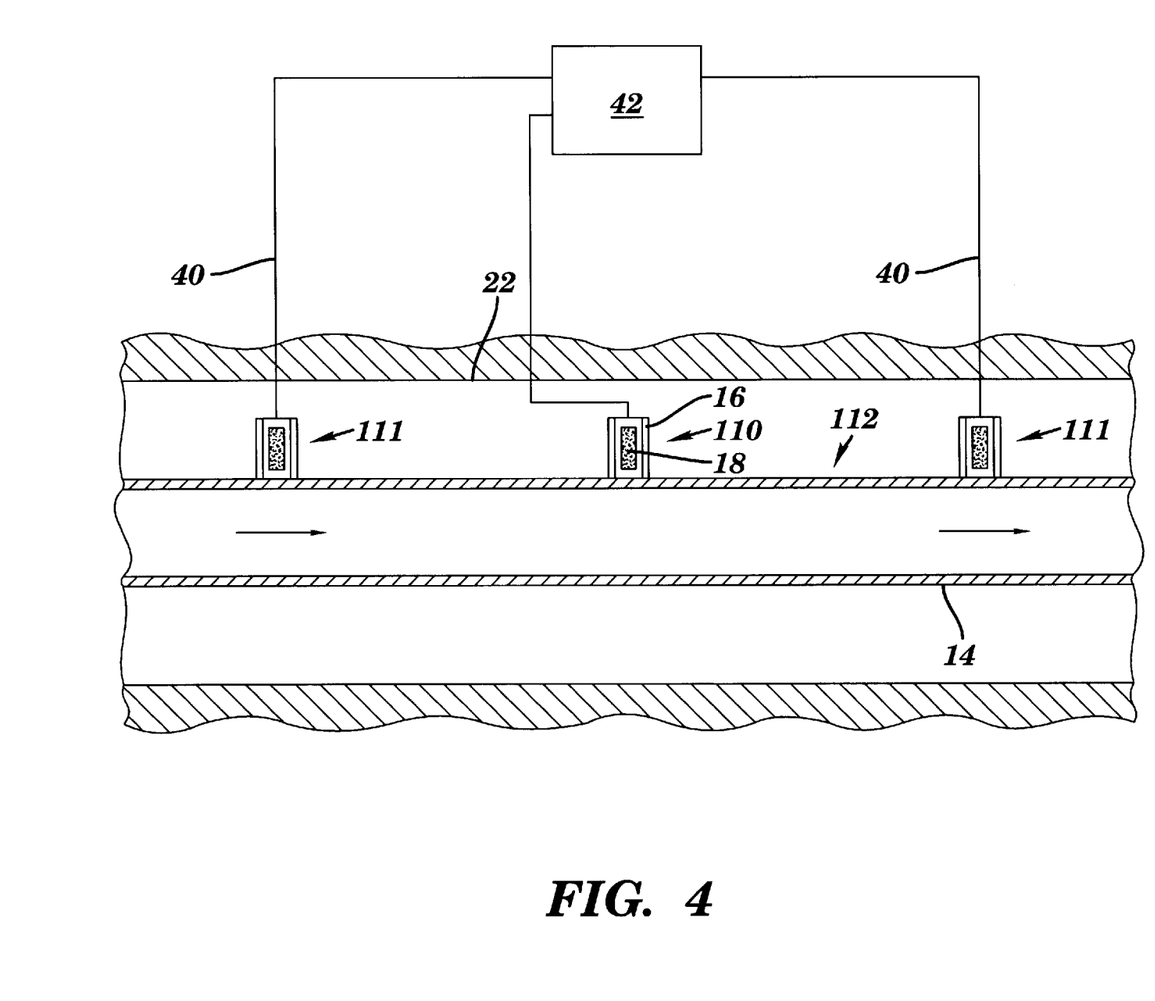
FIG. 4 is a view similar to that of FIG. 1, of a straight tube Coriolis flowmeter utilizing the Coriolis driver of FIG. 3.

Referring to FIG. 3, driver 110 of the subject invention includes a coil 16, ferromagnetic core 18 and a spring 20. As shown, spring 20 is fastened between core 18 and coil 16 to resiliently fasten the core concentrically within the coil. As shown schematically, coil 16 is provided with suitable end plates 24 disposed at opposite ends thereof, to which spring 20 are conveniently secured. Spring 20 preferably comprises two portions 26 disposed at opposite ends of core 18 to secure the core to opposite end plates 24.

Ferromagnetic core 18 is thus adapted to oscillate coaxially with coil 16, along coaxis 21, to alternately expand and contract spring 20, in response to excitation of the coil. Core 18 is provided with a predetermined size and mass, and spring 20 is provided with predetermined parameters, including size, shape and spring rate or constant K sufficient to prevent the core from bottoming out, i.e. contacting end plates 24 and/or compressing spring 20 beyond its range of elasticity during operation. Spring 20 thus serves to guide the oscillations of the ferromagnetic core in a predictable and consistent manner. This enables driver 110 to apply a known, repeatable force, (due to the movement of the mass) at a relatively large amplitude, to flow tube 14 while being free from attachment to a non-moving object. Moreover, by providing a relatively small, oscillating mass as described, rather than a relatively large, inertially stable mass as utilized by Kalotay as discussed hereinabove, the present invention advantageously provides a compact configuration. This aspect enables the present invention to be particularly useful in applications where physical size is important, such as in congested boiler rooms, or in compensation applications in which the driver is preferably disposed within a housing of the flowmeter to be compensated, as will be discussed in greater detail hereinafter.

Figure 7:
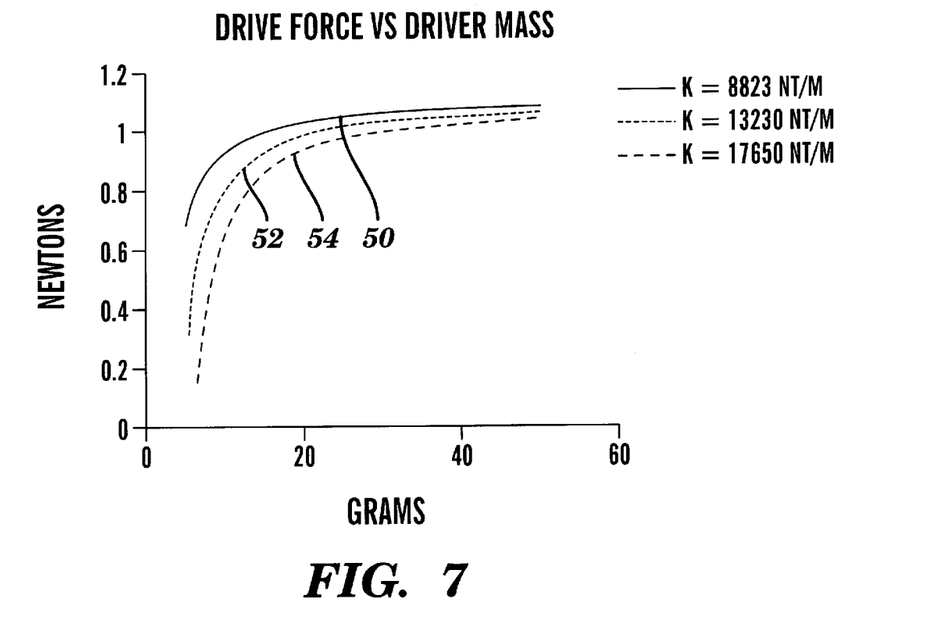
FIG. 7 is a graphical representation of drive force versus mass of a series of driver cores of the present invention.

Turning to FIG. 7, examples of suitable masses for core 18 of a driver 110 and the transmitted drive forces $F_T$ applied thereby, are illustrated at an exemplary drive frequency (i.e. tube resonance frequency) of 400 Hz and a magnetic force generated by coil 16, of 1.1 N (0.25 lbs.). As shown, curve 50 is the force $F_T$ plotted as a function of the mass of core 18 utilizing a spring 20 having a spring constant K of 8823 N/m (50 lbs/inch). Curves 52 and 54 are similar plots at spring constants K of 13234 N/m (75 lbs/inch) and 17646 N/m (100 lbs/inch), respectively. As shown, incremental increases in mass initially generate relatively large increases in force, followed by a more gradual, generally asymptotic increase in force. In this asymptotic range, further increases in core mass generate relatively minor increases in drive force $F_T$. The point or region at which such leveling occurs depends upon the resonance frequency (i.e. drive frequency) and the magnetic force utilized. In the examples shown, such leveling occurs at a mass of approximately 18–20 grams. Thus, when driving at approximately 400 Hz and utilizing a magnetic force of 1.1 N, optimum transmitted force $F_T$ may be obtained with a driver 110 having a core 16 of a mass optimally between approximately 18 and 40 grams.

Figure 8:
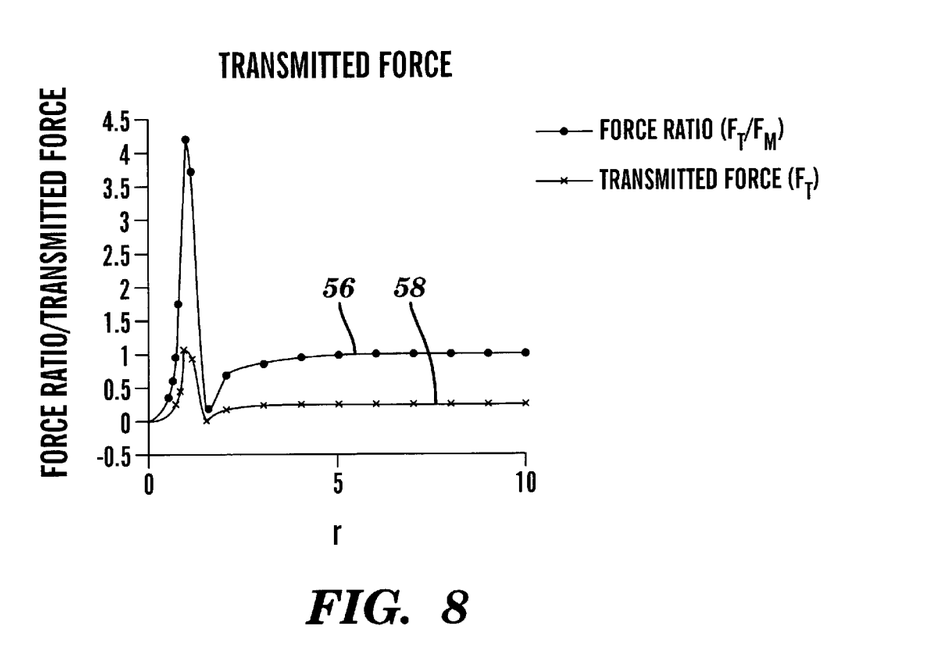
FIG. 8 is a graphical representation of force ratio and transmitted force for a series of Coriolis drivers of the present invention.

Another important factor in determining the mass of core 16 is the resulting resonance frequency of the driver. In this regard, mass of the core should be chosen so that the resonance frequency of the driver is dissimilar to that of the flow tube. Turning to FIG. 8, curve 56 is a plot of the force ratio $F_T/F_M$ (ratio of transmitted force $F_T$ to magnetic force $F_M$) of a driver 110, as a function of ratio r (tube drive or resonance frequency divided by the resonance frequency of the driver). The relationship between these variables is given by the formula:

$$F_T/F_M = |1 - 1/((1-r^2)^2)^{1/2}|$$

Curve 58 is a plot of transmitted force $F_T$ (in lbs.) as a function of ratio r. These curves illustrate that both the force ratio ($F_T/F_M$) and transmitted force $F_T$ tend to spike at a ratio r of about 1, and tend to level off predictably at a ratio r of approximately 3.5 and above. For predictability of response, when utilizing a drive frequency of 400 Hz and a magnetic force of 0.25 lbs., it is desirable to utilize a core 18 having a mass that provides a ratio r of at least approximately 3.5.

Calculated values for the mass of core 16 of a driver 110, and corresponding variables utilizing a lower drive frequency (80 Hz) are shown in the following Tables I–III. At this lower drive frequency, for space considerations, it may be desirable to utilize a core mass which generates a ratio r less than 1.

Table I includes data for K=46.4 N/m (100 lbs./in), a drive frequency of 80 Hz and a magnetic force $F_M$ of 0.25 lbs.

TABLE I

| Mass (grams) | (KG) | res freq (Hz) | r | $F_T/F_M$ | $F_T$ |
|---|---|---|---|---|---|
| 1 | 0.001 | 668.5720 | 0.1196 | 0.0145 | 0.0036 |
| 2 | 0.002 | 472.7518 | 0.1692 | 0.0294 | 0.0073 |
| 3 | 0.003 | 386.0002 | 0.2072 | 0.0448 | 0.0112 |
| 4 | 0.004 | 334.2860 | 0.2393 | 0.0607 | 0.0151 |
| 5 | 0.005 | 298.9944 | 0.2675 | 0.0771 | 0.0192 |
| 6 | 0.006 | 272.9433 | 0.2931 | 0.0939 | 0.0234 |
| 7 | 0.007 | 252.6964 | 0.3165 | 0.1113 | 0.0278 |
| 8 | 0.008 | 236.3759 | 0.3384 | 0.1293 | 0.0323 |
| 9 | 0.009 | 222.8573 | 0.3589 | 0.1479 | 0.0369 |
| 10 | 0.01 | 211.4210 | 0.3783 | 0.1671 | 0.0417 |
| 11 | 0.011 | 201.5820 | 0.3968 | 0.1869 | 0.0467 |
| 12 | 0.012 | 193.0001 | 0.4145 | 0.2074 | 0.0518 |
| 13 | 0.013 | 185.4285 | 0.4314 | 0.2287 | 0.0571 |
| 14 | 0.014 | 178.6833 | 0.4477 | 0.2507 | 0.0626 |
| 15 | 0.015 | 172.6245 | 0.4634 | 0.2735 | 0.0683 |
| 16 | 0.016 | 167.1430 | 0.4786 | 0.2971 | 0.0742 |
| 17 | 0.017 | 162.1525 | 0.4933 | 0.3217 | 0.0804 |
| 18 | 0.018 | 157.5839 | 0.5076 | 0.3472 | 0.0868 |
| 19 | 0.019 | 153.3809 | 0.5215 | 0.3737 | 0.0934 |
| 20 | 0.02 | 149.4972 | 0.5351 | 0.4012 | 0.1003 |
| 30 | 0.03 | 122.0639 | 0.6553 | 0.7529 | 0.1882 |
| 40 | 0.04 | 105.7105 | 0.7567 | 1.3403 | 0.3350 |
| 50 | 0.05 | 94.55036 | 0.8461 | 2.5199 | 0.6299 |
| 60 | 0.06 | 86.31227 | 0.9268 | 6.0963 | 1.5240 |
| 70 | 0.07 | 79.90963 | 1.0011 | 440.92 | 110.23 |
| 80 | 0.08 | 74.74862 | 1.0702 | 5.8755 | 1.4688 |
| 90 | 0.09 | 70.47367 | 1.1351 | 2.4647 | 0.6161 |
| 100 | 0.1 | 66.85720 | 1.1965 | 1.3158 | 0.3289 |

Table II includes data for K=35293 N/m (200 lbs./in), a drive frequency of 80 Hz and a magnetic force $F_M$ of 0.25 lbs.

TABLE II

| Mass (grams) | (KG) | res freq (Hz) | r | $F_T/F_M$ | $F_T$ |
|---|---|---|---|---|---|
| 1 | 0.001 | 945.5036 | 0.0846 | 0.0072 | 0.0018 |
| 2 | 0.002 | 668.5720 | 0.1196 | 0.0145 | 0.0036 |
| 3 | 0.003 | 545.8867 | 0.1465 | 0.0219 | 0.0054 |
| 4 | 0.004 | 472.7518 | 0.1692 | 0.0294 | 0.0073 |
| 5 | 0.005 | 422.8420 | 0.1891 | 0.0371 | 0.0092 |
| 6 | 0.006 | 386.0002 | 0.2072 | 0.0448 | 0.0112 |
| 7 | 0.007 | 357.3667 | 0.2238 | 0.0527 | 0.0131 |
| 8 | 0.008 | 334.2860 | 0.2393 | 0.0607 | 0.0151 |
| 9 | 0.009 | 315.1678 | 0.2538 | 0.0688 | 0.0172 |
| 10 | 0.01 | 298.9944 | 0.2675 | 0.0771 | 0.0192 |
| 11 | 0.011 | 285.0800 | 0.2806 | 0.0854 | 0.0213 |
| 12 | 0.012 | 272.9433 | 0.2931 | 0.0939 | 0.0234 |
| 13 | 0.013 | 262.2355 | 0.3050 | 0.1026 | 0.0256 |
| 14 | 0.014 | 252.6964 | 0.3165 | 0.1113 | 0.0278 |
| 15 | 0.015 | 244.1279 | 0.3276 | 0.1203 | 0.0300 |
| 16 | 0.016 | 236.3759 | 0.3384 | 0.1293 | 0.0323 |
| 17 | 0.017 | 229.3183 | 0.3488 | 0.1385 | 0.0346 |
| 18 | 0.018 | 222.8573 | 0.3589 | 0.1479 | 0.0369 |
| 19 | 0.019 | 216.9134 | 0.3688 | 0.1574 | 0.0393 |
| 20 | 0.02 | 211.4210 | 0.3783 | 0.1671 | 0.0417 |
| 30 | 0.03 | 172.6245 | 0.4634 | 0.2735 | 0.0683 |
| 40 | 0.04 | 149.4972 | 0.5351 | 0.4012 | 0.1003 |
| 50 | 0.05 | 133.7144 | 0.5982 | 0.5575 | 0.1393 |
| 60 | 0.06 | 122.0639 | 0.6553 | 0.7529 | 0.1882 |
| 70 | 0.07 | 113.0092 | 0.7079 | 1.0045 | 0.2511 |
| 80 | 0.08 | 105.7105 | 0.7567 | 1.3403 | 0.3350 |
| 90 | 0.09 | 99.66483 | 0.8026 | 1.8114 | 0.4528 |
| 100 | 0.1 | 94.55036 | 0.8461 | 2.5199 | 0.6299 |

Table III includes data for K=8823 N/m (50 lbs./in), a drive frequency of 80 Hz and a magnetic force $F_M$ of 0.25 lbs.

TABLE III

| Mass (grams) | (KG) | res freq (Hz) | r | $F_T/F_M$ | $F_T$ |
|---|---|---|---|---|---|
| 1 | 0.001 | 472.7518 | 0.1692 | 0.0294 | 0.0073 |
| 2 | 0.002 | 334.2860 | 0.2393 | 0.0607 | 0.0151 |
| 3 | 0.003 | 272.9433 | 0.2931 | 0.0939 | 0.0234 |
| 4 | 0.004 | 236.3759 | 0.3384 | 0.1293 | 0.0323 |
| 5 | 0.005 | 211.4210 | 0.3783 | 0.1671 | 0.0417 |
| 6 | 0.006 | 193.0001 | 0.4145 | 0.2074 | 0.0518 |
| 7 | 0.007 | 178.6833 | 0.4477 | 0.2507 | 0.0626 |
| 8 | 0.008 | 167.1430 | 0.4786 | 0.2971 | 0.0742 |
| 9 | 0.009 | 157.5839 | 0.5076 | 0.3472 | 0.0868 |
| 10 | 0.01 | 149.4972 | 0.5351 | 0.4012 | 0.1003 |
| 11 | 0.011 | 142.5400 | 0.5612 | 0.4598 | 0.1149 |
| 12 | 0.012 | 136.4716 | 0.5862 | 0.5235 | 0.1308 |
| 13 | 0.013 | 131.1177 | 0.6101 | 0.5930 | 0.1482 |
| 14 | 0.014 | 126.3482 | 0.6331 | 0.6691 | 0.1672 |
| 15 | 0.015 | 122.0639 | 0.6553 | 0.7529 | 0.1882 |
| 16 | 0.016 | 118.1879 | 0.6768 | 0.8456 | 0.2114 |
| 17 | 0.017 | 114.6591 | 0.6977 | 0.9486 | 0.2371 |
| 18 | 0.018 | 111.4286 | 0.7179 | 1.0637 | 0.2659 |
| 19 | 0.019 | 108.4567 | 0.7376 | 1.1933 | 0.2983 |
| 20 | 0.02 | 105.7105 | 0.7567 | 1.3403 | 0.3350 |
| 30 | 0.03 | 86.31227 | 0.9268 | 6.0963 | 1.5240 |
| 40 | 0.04 | 74.74862 | 1.0702 | 5.8755 | 1.4688 |
| 50 | 0.05 | 66.85720 | 1.1965 | 1.3158 | 0.3289 |
| 60 | 0.06 | 61.03199 | 1.3107 | 0.3924 | 0.0981 |
| 70 | 0.07 | 56.50464 | 1.4158 | 0.0045 | 0.0011 |
| 80 | 0.08 | 52.85525 | 1.5135 | 0.2253 | 0.0563 |
| 90 | 0.09 | 49.83241 | 1.6053 | 0.3659 | 0.0914 |
| 100 | 0.1 | 47.27518 | 1.6922 | 0.4634 | 0.1158 |

Turning now to FIG. 4, driver 110 is rigidly disposed on flow tube 14, without being secured to support 22. This disposition is accomplished by fastening either coil 16 or core 18 to the flow tube. In a preferred embodiment as shown, coil 16 is fastened to the flow tube 14. Thus, during operation, core 18 is adapted to oscillate within coil 16 and thereby apply a known repeatable force to flow tube 14 through endplate 24 (FIG. 3) to either drive or compensate Coriolis flowmeter 112.

As mentioned hereinabove, use of driver 110 to compensate the flowmeter includes use of the driver to simulate forces generated during mass flow through a flow tube of a flowmeter. For example, the driver may be used to apply an oscillating force to a conventional Coriolis flowmeter to provide either a continuous or a scheduled calibration or calibration verification. Use of the free standing driver 110 advantageously provides a force that is not influenced by external effects transmitted to the tube due to a grounded reference.

In one embodiment of this approach, flow through the flowmeter is shut off and one or more drivers 110 are disposed at position(s) on the flowtube predetermined to provide optimal excitation of the flowtube. Drivers 110 then may be operated to provide a known reference force which is 90 degrees out of phase from the drive signal to simulate fluid flow through the flowtube. The actual response then may be compared to the expected response. An discrepancy between these values may be used to signal for corrective action.

In another embodiment, reference forces may be applied during constant fluid flow through the flowmeter. The reference forces would be generated sequentially to simulate a slight forward, then a slight reverse flow. In this regard, flow at time 1 ($Flow_{T1}$) should equal $Flow_0$ of the fluid+the simulated flow ($Flow_{SIM}$). Flow at time 2 ($Flow_{T2}$) should equal $Flow_0-Flow_{SIM}$. Subtracting these equations yields:

$$Flow_{T1}-Flow_{T2}=2\times Flow_{SIM}$$

If $Flow_{SIM}$ is not the expected value, then corrective action may be initiated.

In this manner, the present invention may be utilized to apply a predetermined vibration to a conventional Coriolis flowmeter for calibration, verification or certification purposes. An example of a conventional Coriolis flowmeter which may utilize driver 110 in this manner is disclosed in commonly assigned U.S. Pat. No. 5,271,281 to Mattar, et al. entitled CORIOLIS-TYPE MASS FLOWMETER, ("Mattar, et al.") which is hereby fully incorporated by reference herein. As discussed, the compact construction of the present invention enables it to be permanently mounted within the housing of such a flowmeter for convenient use.

As also shown, Coriolis flowmeter 112 includes a pair of sensors 111 preferably disposed on opposite sides of driver 110. These sensors operate in a manner familiar to those skilled in the art as will be discussed further hereinbelow. Sensors 111 may comprise any suitable devices known to those skilled in the art. In a preferred embodiment as shown, sensors 111 are fabricated as drivers 110 adapted to operate in reverse as free-floating accelerometers. In this manner, a Coriolis flowmeter 112 is provided which is not dependent upon being mechanically grounded to a stationary support 22.

Figure 5A:
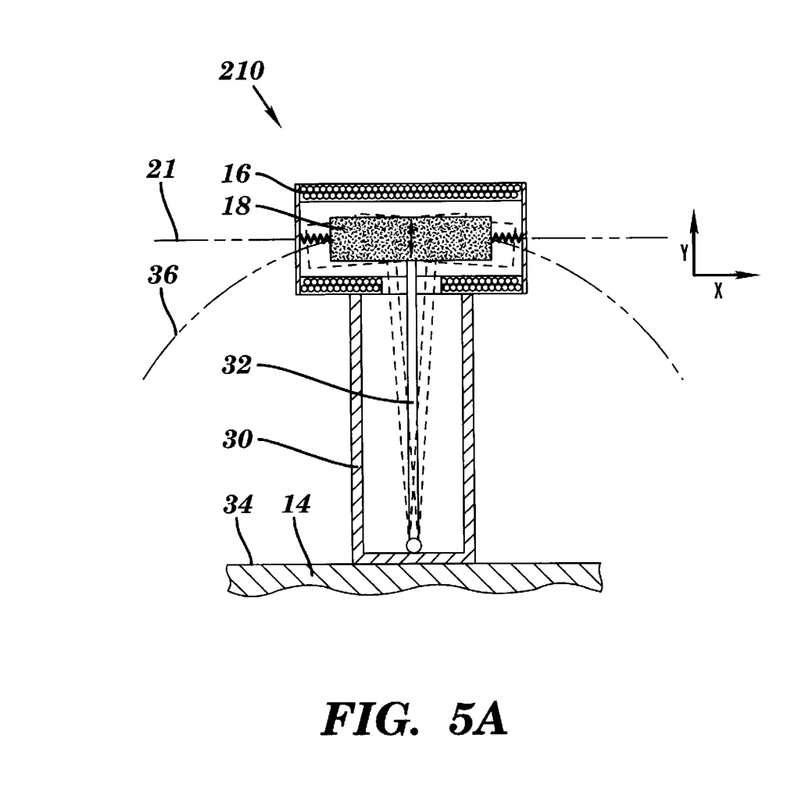
FIG. 5A is a schematic cross-sectional view, with portions shown in phantom to indicate movement, of an alternate embodiment of the Coriolis driver of the present invention.

Turning now to FIG. 5A, an alternate embodiment of the present invention comprises driver 210. Driver 210 utilizes centripetal acceleration to apply a consistent periodic force to a flow tube. Driver 210 includes a coil 16, ferromagnetic core 18 and spring 20 substantially as shown and described hereinabove with respect to driver 110. Additionally, driver 210 includes a housing 30 adapted for disposition on a surface 34 of flow tube 14, and an elongated restraint 32 of predetermined length disposed therein. Restraint 32 is pivotally fastened at one end thereof proximate surface 34, and extends substantially orthogonally outward therefrom to a terminal end fastened to core 18. When core 18 is in its rest or unexcited position, restraint 32 extends substantially orthogonally to coaxis 21 as shown. Alternatively, however, driver 210, including housing 30, may be configured so that restraint 32 extends obliquely relative to coaxis 21 when the core is in its rest position.

Excitation of the coil will move core 18 and restraint 32 in an oscillatory fashion from their rest positions as shown, to predetermined positions on opposite sides of the rest position as shown in phantom. The restraint nominally remains at its predetermined length so that in addition to moving in the x-direction, this oscillatory motion serves to centripetally accelerate the core in the y-direction orthogonal to coaxis 21. Thus, during operation, restraint 32 serves to maintain core 18 within a curved path 36 rather than along a straight path defined by coaxis 21 as discussed above. This centripetal acceleration thus generates an oscillatory force in the y-direction as shown.

Figure 5B:
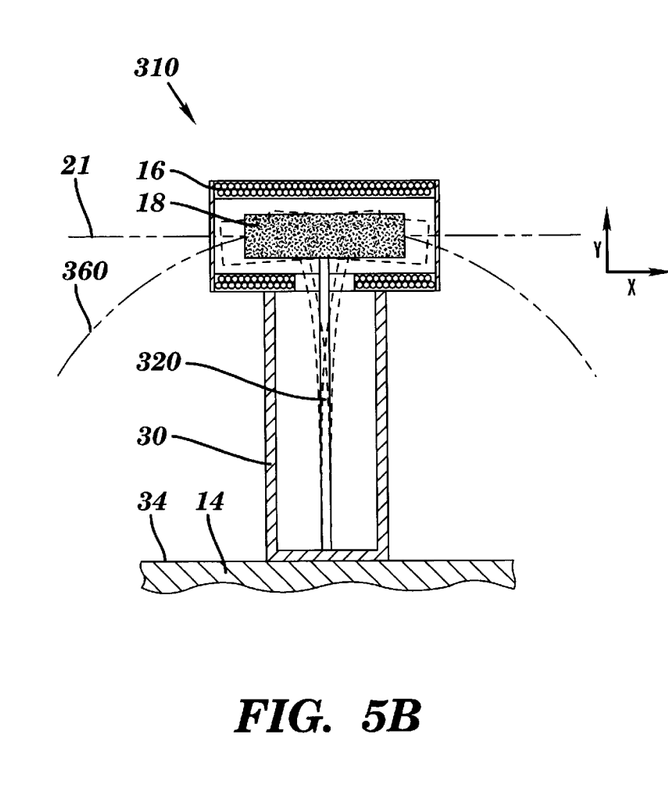
FIG. 5B is a schematic cross-sectional view, with portions shown in phantom to indicate movement, of a variation of the embodiment of the Coriolis driver of FIG. 5A.

A variation of driver 210 is shown as driver 310 in FIG. 5B. Driver 310 is substantially identical to driver 210, except that the functions of restraint 32 and spring 20 of driver 210 are provided by a single cantilevered resilient member or cantilever spring 320. Spring 320 is rigidly fastened at one end proximate surface 34, while its other end is fastened to core 18. Excitation of coil 16 generates an oscillatory movement in which spring 320 flexes or bends against its bias to maintain core 18 within a curved path 360 substantially in the manner described hereinabove with respect to driver 210. Cantilever spring 320 is provided with a predetermined elasticity or stiffness sufficient to generate a bias or spring force adapted to enable such oscillatory movement while nominally preventing impact of core 18 with housing 30. Utilizing a single element 320 in this manner as both a restraint and spring advantageously tends to simplify fabrication and reduce manufacturing cost relative to driver 210.

Figure 6:
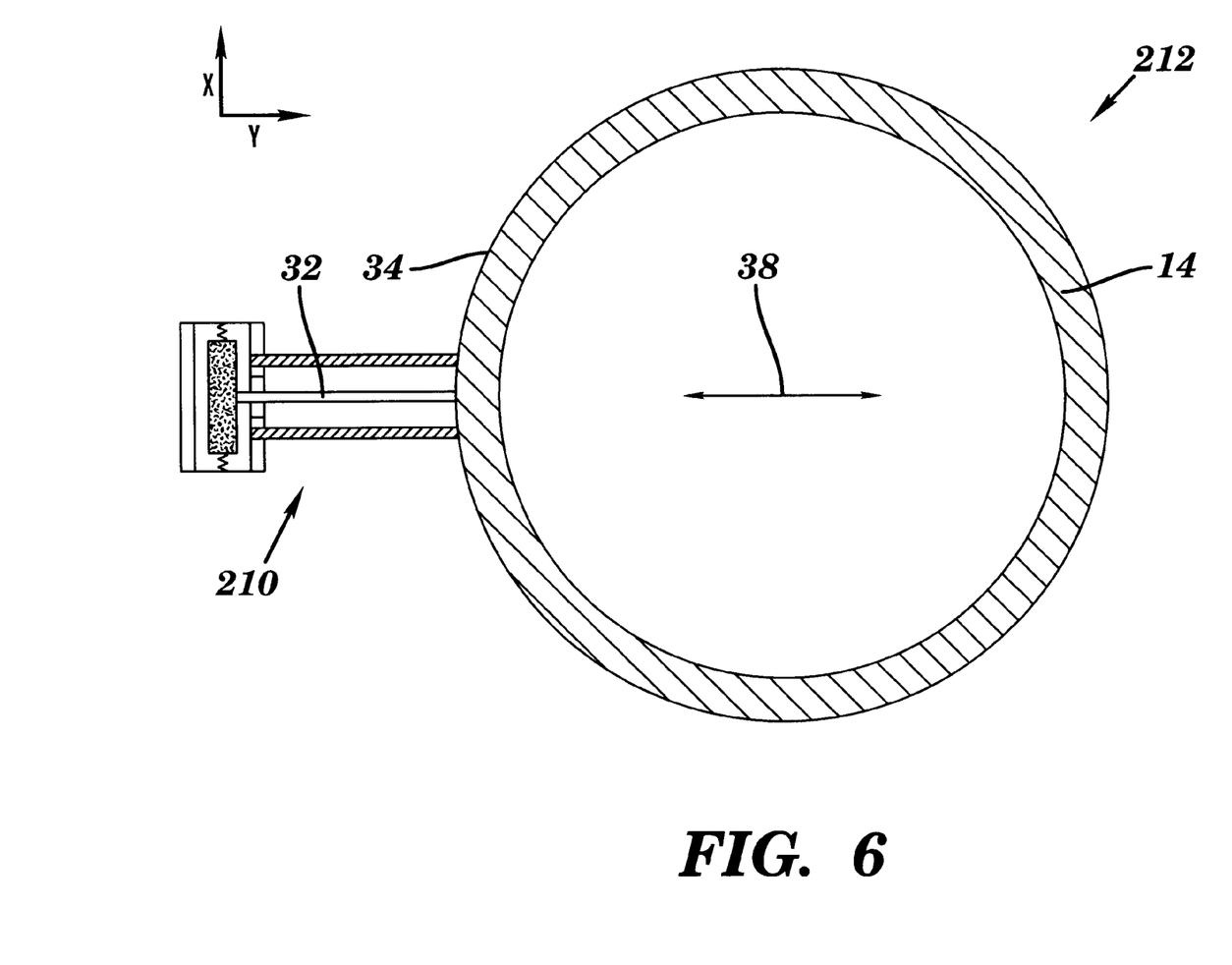
FIG. 6 is a schematic transverse cross-sectional view of a straight tube Coriolis flowmeter utilizing the Coriolis driver of FIG. 5A.

Turning now to FIG. 6, driver 210 is disposed on surface 34 of flow tube 14 and is thus adapted to drive the flow tube both parallel to coaxis 21 (in the x direction) and orthogonal to the coaxis (in the y direction).

In operation of a Coriolis flowmeter 112 or 212, driver 110 or 210 of the present invention is adapted to vibrate flow tube 14 at a predetermined resonance frequency. This resonance frequency is predetermined based on the physical parameters of the flowmeter and fluid flowing therethrough. The value of the frequency may be calculated using these parameters, or may be read from memory, i.e. a Read-Only-Memory (ROM), of a computational means, such as a microprocessor based microcontroller or computer 42. The resonance frequency may vary during operation due to changes in various parameters such as the temperature and density of the fluid flowing through the flowmeter. The control unit thus preferably adaptively controls the resonance frequency either by an open or closed loop feedback system. In the event a closed loop system is preferred, a third sensor 111 (not shown) may be disposed proximate the driver to provide feedback sufficient to modulate the excitation current being fed to coil 16. Such driver feedback alternatively may be provided by intermittently reversing operation of driver 110 to serve as a sensor. This latter approach may be accomplished by periodically disconnecting the driver current source from coil 16 during oscillation of the driver, measuring the current generated in the coil in response to the oscillation for one or more oscillatory cycles, then reconnecting the driver current source.

Still further, sensors 111 (FIG. 4) utilized to determine mass flow rate may be utilized to provide this feedback. This may be accomplished in the manner set forth in the above-referenced patent to Mattar, et al. utilizing conventional algebraic techniques.

The flowmeter may determine mass flow rate therethrough in any convenient manner. In a preferred embodiment, for example, outputs generated by a pair of sensors 111 may be utilized to determine the phase or time shift of vibration of flow tube 14 between the locations thereof. This may be accomplished in a manner familiar to those skilled in the art, such as disclosed by Kalotay as referenced hereinabove. One method for calculating mass flow rate, which is familiar to those skilled in the art is as follows:

Output $S_1$ of a first sensor 111 positioned on one side (i.e. upstream) of a driver in a straight tube Coriolis flowmeter as shown in FIG. 4, is provided by the equation:

$$S_1 = |S_D|SIN(\omega t) + |S_C|COS(\omega t)$$

where $\omega$ is the frequency of the oscillation, $|S_D|SIN(\omega t)$ represents the drive component of the oscillation, and $|S_C|COS(\omega t)$ represents the Coriolis component of the oscillation. Similarly, the output $S_2$ of a second sensor 111 positioned on the opposite side (i.e. downstream) of the driver, is provided by the equation:

$$S_2 = |S_D|SIN(\omega t) - |S_C|COS(\omega t)$$

These equations may be combined to yield the relationships:

$$S_1 - S_2 = 2|S_C|COS(\omega t) \text{ and } S_1 + S_2 = 2|S_D|SIN(\omega t).$$

Further algebraic manipulation of these relationships yields the following equation for mass flow rate:

$$\dot{m} = const \times \frac{|S_C|}{|S_D|\omega} = const \times \frac{|S_1 - S_2|}{|S_1 + S_2|\omega}$$

Further, the character φ denotes the phase difference between $S_1$ and $S_2$, and TAN $(\phi/2) = S_C/S_D$. For small angles φ, (φ/2) is approximately equal to $S_C/S_D$, to yield the relationships:

$$TAN\left(\frac{\phi}{2}\right) = \frac{S_C}{S_D}$$

for φ small $$\frac{\phi}{2} \approx \frac{S_C}{S_D}$$

$$\dot{m} = const \times \frac{|S_C|}{|S_D|\omega} \approx const \times \frac{\phi}{2\omega}$$

The signals from sensors 111 thus may be communicated by suitable leads 40 to conventional processing circuitry such as a common microcontroller 42 to calculate mass flow rate information therefrom in a convenient manner, such as herein described.

Alternatively, as also disclosed by Kalotay, flowmeter 112 or 212 may utilize a single sensor 111 disposed proximate a zero flow node point of flow tube 14. Displacement of this sensor during flow through tube 14 then may be utilized to calculate the mass flow rate.

As a further alternative, driver 110 or 210 may be disposed at the apex of a circular flow tube (as opposed to straight flow tube 14 as shown) to vibrate the tube between parallel planes on either side of its static plane in the manner disclosed by Herzl as also referenced hereinabove. Sensors 111 disposed on opposite sides of the driver may comprise strain gauges as taught by Herzl to measure torsional forces on flow tube 14 generated by Coriolis forces during flow through the tube. Outputs of the strain gauges may then be applied to a differential amplifier whose output would be proportional to the mass flow rate of the fluid.

Although primarily described herein with respect to a single straight flow tube 14 of circular transverse cross-section, one skilled in the art should recognize that the present invention may be practiced with one or more flow tubes of substantially any configuration, i.e. curved or straight flow tubes having circular or non-circular transverse cross-sections, without departing from the spirit and scope of the invention.

The foregoing description is intended primarily for purposes of illustration. Although the invention has been shown and described with respect to an exemplary embodiment thereof, it should be understood by those skilled in the art that the foregoing and various other changes, omissions, and additions in the form and detail thereof may be made therein without departing from the spirit and scope of the invention.

Having thus described the invention, what is claimed is:

1. A transducer for a Coriolis flowmeter having a flow tube vibratable at a predetermined resonance frequency to determine mass flow rate of a fluid passing therethrough, said transducer comprising:

a coil;

a ferromagnetic core disposed coaxially within said coil; one of said coil and said ferromagnetic core being rigidly disposable on the flow tube;

said ferromagnetic core and said coil being oscillatable relative to one another in response to excitation of one of said coil and said flow tube;

a resilient member coupling said ferromagnetic core to said coil; and said transducer being free from attachment to a non-moving object.

2. The transducer as set forth in claim 1, wherein said transducer comprises a driver, said coil being excitable by an alternating current power source so that said driver vibrates said flow tube.

3. The transducer as set forth in claim 2, wherein said driver further comprises a calibration/verification driver to simulate mass flow through the flowmeter.

4. The transducer as set forth in claim 1, wherein said transducer comprises a sensor, said core being oscillatable relative to said coil by vibration of the flow tube so that said coil generates an output signal in response thereto.

5. The transducer as set forth in claim 1, wherein the Coriolis flow meter is determines the mass flow rate by measuring phase shift of vibrations of the flow tube between first and second locations spaced along the flow tube.

6. The transducer as set forth in claim 1, wherein the Coriolis flowmeter determines mass flow rate by measuring deflection of the flow tube during mass flow therethrough.

7. The transducer as set forth in claim 1, wherein the Coriolis flowmeter determines mass flow rate by measuring torsional deflection of the flow tube during mass flow therethrough.

8. The transducer as set forth in claim 1, wherein one of said core and said coil is oscillatable along a substantially straight path relative to an other of said core and said coil.

9. The transducer as set forth in claim 1, wherein one of said core and said coil is acceleratable centripetally relative to an other of said core and said coil.

10. The transducer as set forth in claim 1, wherein one of said core and said coil is movable along a curved path relative to an other of said core and said coil.

11. The transducer as set forth in claim 10, further comprising:

a housing to rigidly fasten the one of said core and said coil to the flow tube; and a restraint having a first end pivotally fastened to one of said housing and said flow tube and a second end fastened to the other of said core and said coil;

wherein during said oscillation, said restraint pivots about said first end thereof to centripetally accelerate the other of said core and said coil.

12. The transducer as set forth in claim 10, wherein said resilient member further comprises a cantilever spring and said transducer includes:

a housing to rigidly fasten the one of said core and said coil to the flow tube; and said cantilever spring having a first end fastened to one of said housing and said flow tube and a second end fastened to the other of said core and said coil;

wherein during said oscillation, said cantilever spring is resiliently deflectable to centripetally accelerate the other of said core and said coil.

13. The transducer as set forth in claim 12, wherein the one of said core and said coil comprises said coil and the other of said core and said coil comprises said core.

14. A method for vibrating a flow tube of a Coriolis flowmeter at a predetermined resonance frequency to determine the mass flow rate of a fluid passing therethrough, said method comprising the steps of:

(a) providing a driver having:

(i) a coil;

(ii) a ferromagnetic core disposed coaxially within the coil; and (iii) a resilient member coupling the ferromagnetic core to the coil;

(b) rigidly disposing one of the coil and the ferromagnetic core on the flow tube;

(c) maintaining the driver free from attachment to a non-moving object; and (d) applying an alternating current to the coil, wherein the ferromagnetic core and the coil are oscillated relative to one another and the resilient member serves to constrain the oscillations of the ferromagnetic core relative to the coil.

15. The method as set forth in claim 14, wherein one of the core and the coil is movable along a straight path relative to an other of the core and the coil.

16. The method as set forth in claim 14, wherein one of the core and the coil is movable along a curved path relative to an other of the core and the coil.

17. The method as set forth in claim 16, wherein said step (a) further comprises providing a driver having:

(iv) a housing to rigidly fasten the one of the core and the coil to the flow tube;

(v) a restraint having a first end pivotally fastened to one of the housing and the flow tube and a second end fastened to the other of the core and the coil;

wherein during the oscillation, the restraint is pivotable about the first end thereof to centripetally accelerate the other of the core and the coil.

18. The method as set forth in claim 17, wherein said step (b) further comprises rigidly disposing the coil on the flow tube.

19. A method for determining mass flow rate of a fluid passing through a flow tube, said method comprising the steps of:

(a) providing a driver having:
(i) a coil;
(ii) a ferromagnetic core disposed coaxially within the coil; and
(iii) a resilient member coupling the ferromagnetic core to the coil;

(b) rigidly disposing one of the coil and the ferromagnetic core on the flow tube;

(c) maintaining the driver free from attachment to a non-moving object;

(d) applying an alternating current to the coil, wherein the ferromagnetic core and the coil are oscillated relative to one another at a predetermined frequency and the resilient member serves to constrain the oscillations of the ferromagnetic core relative to the coil, so that the driver vibrates the flow tube at a predetermined resonance frequency;

(e) disposing at least one sensor a predetermined distance from the driver on the flow tube, the at least one sensor being generating an output signal corresponding to vibration of the flow tube thereat; and (f) applying the output signal to a computational means to determine the mass flow rate.

20. The method as set forth in claim 19, further comprising the steps of:

(g) selectively removing and reapplying the alternating current to the driver during oscillation, wherein while the alternating current is removed, the driver will serve as a second sensor to generate an other output signal corresponding to vibration of the flow tube thereat; and (f) utilizing the second output signal to control the alternating current.

21. The method as set forth in claim 19, further comprising the steps of:

(h) disposing a plurality of sensors in spaced relation along the flow tube for generating a plurality of output signals;

(i) applying the plurality of output signals to the computational means; and (j) comparing the plurality of output signals to one another for determination of the mass flow rate.

22. The method as set forth in claim 21, wherein the plurality of sensors are each generate an output signal corresponding to vibration of the flow tube thereat, wherein the output signals are compared to one another to measure difference in phase of vibration of the flow tube for determination of the mass flow rate.

23. The method as set forth in claim 21, wherein the plurality of sensors each generate an output signal corresponding to torque generated in the flow tube thereat, wherein the output signals are compared to one another to measure difference in torque of the flow tube for determination of the mass flow rate.

* * * * *